June 6, 1950 — O. K. MARQUARDT — 2,510,750
INLAY TRANSFER METHOD OF PRINTING THERMOPLASTIC FILMS
Filed April 23, 1947 — 2 Sheets-Sheet 1
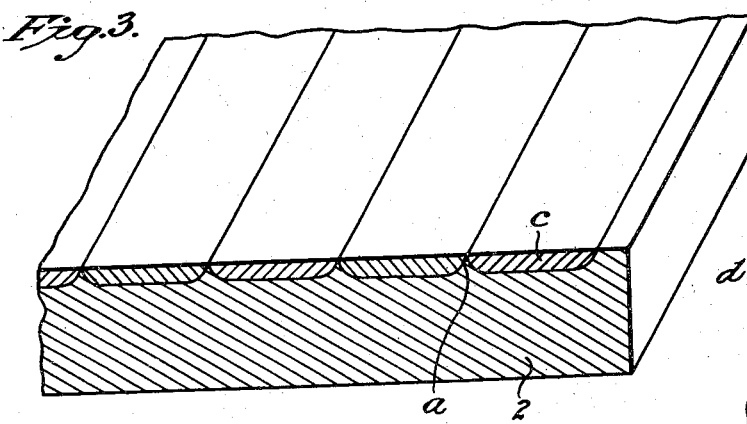
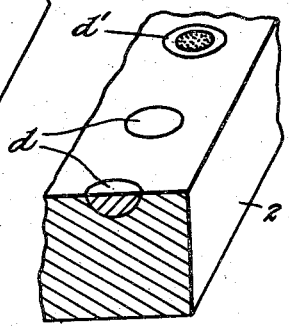
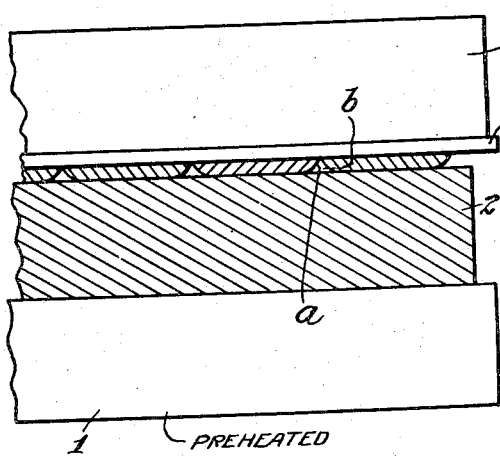
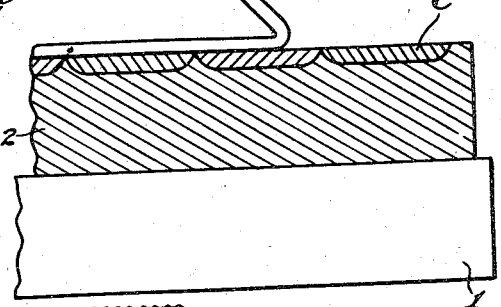
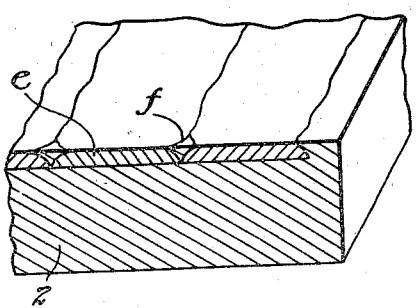
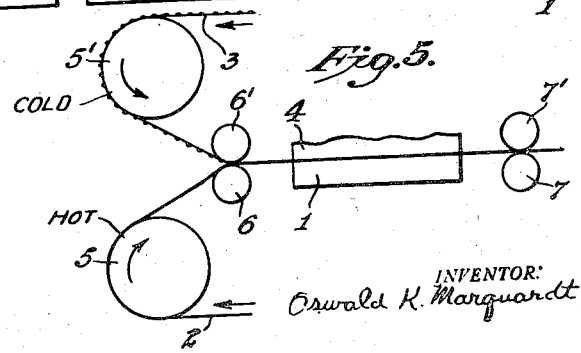
INVENTOR:
Oswald K. Marquardt,
BY
His ATTORNEY.

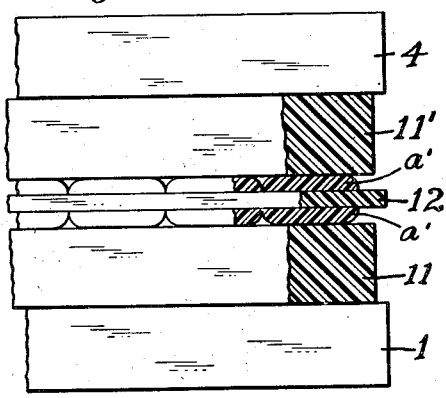
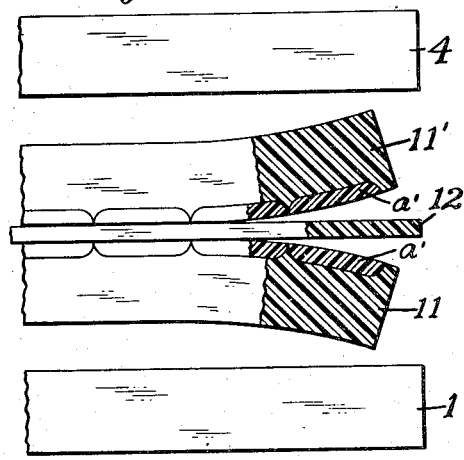
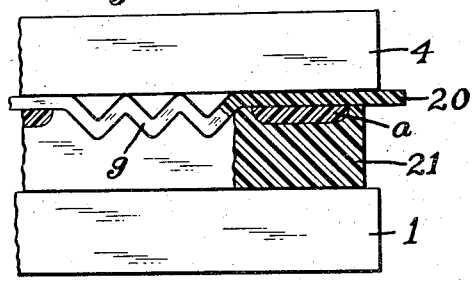
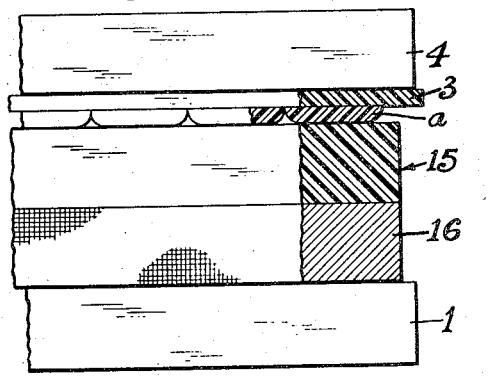
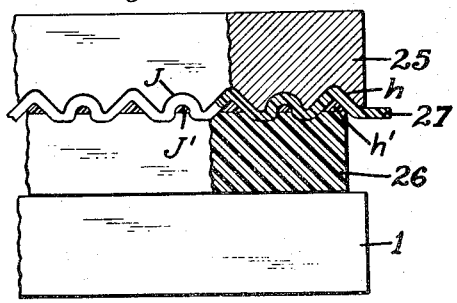
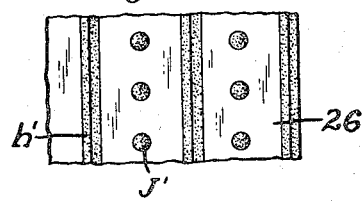

Patented June 6, 1950

2,510,750

UNITED STATES PATENT OFFICE 2,510,750

INLAY TRANSFER METHOD OF PRINTING THERMOPLASTIC FILMS

Oswald K. Marquardt, Montclair, N. J.

Application April 23, 1947, Serial No. 743,354

10 Claims. (Cl. 154—99)

This invention relates to the printing of heat-sealable thermoplastic film, both supported film, i. e., re-inforced with a backing sheet, and unsupported film.

The principal objects of the invention comprise the expeditious and economic inlay-transfer printing of such films, more especially those composed of vinyl chloride resin and copolymers of vinyl chloride and vinyl acetate resins. Further objects of the invention are the faithful reproduction upon such films of the selected designs, patterns or characters by effecting such inlay-transfer of the same from a substantially dry cellophane sheet upon which the same are imprinted to the thermoplastic receiving film while the latter is also in a substantially dry state whereby, due to the absence of volatile solvents both in the ink so transferred and inlaid as well as in the receiving film and also due to the manner of such transfer, many advantages, hereinafter specified, resulted. Other objects of the invention will hereinafter appear.

Heretofore, as I am well aware, it has been the common practice in printing upon such thermoplastic film, to employ expensive non-smearing intaglio-type inks, which were applied to such films either by the well known intaglio or rotogravure printing methods. When so printing heat-sealable thermoplastic films it is customary, due to the same being waterproof and relatively non-absorptive of such inks, and in this respect wholly unlike paper and like non-waterproof and absorptive materials to which such inks are commonly applied, to incorporate therein sufficient solvents of the resins constituting the heat-sealable thermoplastic film to which they are to be applied in order to locally dissolve that part of the film on which the ink is deposited and to thereby effect a certain measure of adhesion of the inked impressions on the film after the same have been dried and cured. Up to the present time such methods of printing on thermoplastic film have not resulted in the ink being inlaid in such film so that its top surface lies flush with the film surface and, consequently, the ink imprints had a tendency to "sit" on the top of the film whereby, since it had not been imbedded therein, it was susceptible to being easily scraped off or removed by ordinary wear thereon.

In an attempt to effect the inlay of these inks in the film, it has also been customary to subject the printed film to heat and pressure in order to force ink into the film and to cause it to lie flush with the film surface. However, due to the fact that the inks employed and the thermoplastic films to which they were applied contained the same basic ingredients, they possessed essentially the same characteristics, more especially as respects their solubilities, their melting points, coefficients of expansion and the like. When, consequently, the printed film was so subjected to heat and pressure, in an attempt to inlay the ink, there was a tendency for the ink to be pushed or squeezed out beyond the pattern or design boundaries with the resultant smearing of the lines of the pattern or design as imprinted on the film and the consequent loss of definition or faithful reproduction, since the pressure plate of the hydraulic press so employed first came in contact with the ink imprints on the film before contacting the film itself. In the case of circular dots, such contact of the ink impressions with the pressure plate tended to distort the same into irregular shapes and in general all of the other shapes of the pattern to be reproduced were distorted to a greater or lesser extent.

In addition to the foregoing disadvantages, there was the tendency for the applied ink on the selected film to offset on the pressure plates of the hydraulic press. On subsequent use of the press, the ink so offset on such pressure plate was often transferred to the inked impression on the film and appeared usually in undesirable locations thereof.

The fact that the pressure plate first contacted the ink deposited on the film and distorted the impressed pattern, inevitably rendered it extremely difficult to obtain exact registry in the case of multi-color printing due to the slight overlapping of the different color designs so applied to the film. Moreover, in the case of unsupported film, registry was also difficult to obtain, due to the tendency of the film to stretch differently as each design section of a different color was successively applied to the film.

Due to the fact that special drying equipment is required to evaporate the ink solvents when printing directly on heat-sealable thermoplastic film, it is customary to ship the film to be printed from the place of manufacture to a printer having suitable drying and fusing equipment and after the film has been printed the printer then re-ships the same to such manufacturer. Not only are the shipping charges so incurred often quite considerable in amount, but in those cases where the film is directly printed the loss incurred, due to wastage of the film when the printing is found to be faulty, is also a not insignificant item of expense.

Still another method of printing of heat-sealable thermoplastic film which has been heretofore practiced, is that employed in the manufacture of articles such as ornamental shower curtains. In this method, the film is formed in situ on a printed urea-formaldehyde-resin-coated sheet by casting the organosol dispersion of the heat-sealable thermoplastic vinyl resin or copolymer, such as aforesaid, that is used to form the desired film, directly upon the urea resin coating of such a sheet. Here again, the solvents present in the dispersion tended to spread the ink and prevent patterns of good definition being transferred when the urea resin sheet was separated from the cast film by stripping the same off therefrom. Furthermore, this casting and simultaneous printing method cannot be employed for the production of printed, supported or reinforced, heat-sealable thermoplastic film.

My investigations have led to the discovery that the foregoing disadvantages and objections heretofore encountered in the direct printing of heat-sealable thermoplastic film, can be entirely overcome by employing the novel method of inlay-transfer printing set forth in the following detailed description, and drawings forming a part thereof, in which Figure 1 is a magnified elevation, partially in section, of a hydraulic press, showing the position of the parts prior to the application of pressure to an imprinted cellophane sheet and an underlying heat-sealable thermoplastic film;

Figure 2 is a similar elevation, partly in section, showing the cellophane sheet partially stripped from the imprinted film following the pressure stage of the operation and after elevating the pressure plate from off the imprinted film.

Figure 3 is a magnified fragmentary perspective view of the imprinted film; and Figure 3a is a similar view of an imprinted film having a different pattern inlaid therein.

Figure 4 is a magnified fragmentary perspective view of a film as imprinted by the direct method now commonly practiced; and Figure 5 is a diagrammatic view showing the manner in which heat-sealable thermoplastic film is imprinted in accordance with my preferred method of printing on such film.

Fig. 6 is a magnified view, generally similar to Fig. 1, but in which the cellophane transfer sheet is printed on both sides and the transfer is effected to two separate films;

Fig. 7 is a view generally similar to Fig. 6 but the press is opened and the cellophone sheet is partially stripped from the adjacent thermoplastic films;

Fig. 8 is a view generally similar to Fig. 1 but wherein the thermoplastic film shown is a supported film having a re-inforcing backing of paper or cloth;

Fig. 9 is a fragmentary, magnified elevation, partly in section, of a hydraulic press, showing the position of the parts at the completion of the pressure stroke and wherein a pre-embossed, printed cellophane sheet has been employed as the transfer sheet;

Fig. 10 is a fragmentary, magnified elevation, partly in section, of a press wherein the lower face of the pressure plate is engraved with a selected pattern or design and showing the position of the parts at the completion of the pressure stroke; and Fig. 11 is a plan view, generally similar to Fig. 3a, of a film imprinted in the manner shown in Fig. 10.

In carrying out my improved method of inlay-transfer printing on heat-sealable thermoplastic film, it is preferable to proceed as follows:

The platen 1 of a hydraulic press is preferably preheated to about 300° to 350° F. and the heat-sealable thermoplastic film 2 to be printed is then positioned on the platen. Desirably such film is either composed of vinyl chloride resin or a copolymer of vinyl chloride resin and vinyl acetate resin, both of which are well-known and now commercially available. If desired, such film may be a supported film having a paper or cloth re-inforcing backing adhesively united thereto.

A sheet of cellophane 3, having imprinted thereon the desired pattern or characters, such, for example, as the stripes a, which are of truncated convex contour and are separated adjacent their longitudinal edges by air gaps b, is then laid face down on the top surface of the film 2, and pressure is applied to said sheet by means of its pressure plate 4, said sheet having been subjected to sufficient heat, following the printing thereof, to volatilize the ink solvents in the inked pattern thereon and to thoroughly set the same.

Preferably, as shown in Fig. 5, the film 2 is pre-heated by passage over a drum 5 heated to between about 300° and 350° F. to soften the same and render it tacky and, likewise, the printed cellophane sheet 3, following the drying thereof, as aforesaid, is chilled to harden the ink thereon by passing the same over a metal drum 5' containing a cooling fluid. The heated film and the chilled sheet are then caused to simultaneously pass through pressure rolls 6, 6' which apply sufficient pressure to the same, while they are in a superimposed relation, to squeeze out any air therebetween so as to insure against the presence of any air bubbles in the final printed film delivered by the hydraulic press, and then the adhesively united film and printed cellophane sheet are delivered to the platen 1 of the press and sufficient pressure, say between about 300 to 350 p. s. i. is then applied to the imprinted upper surface of the cellophane sheet 3, by means of the pressure plate 4, for a brief period, of say 6 to 25 seconds, in order to forcibly project the relatively hard ink impressions on the cellophane sheet, which constitute the pattern thereon, completely into the softened tacky film 2. As a result, as shown in Figs. 2, 3 or 3a, the top surfaces of such ink masses lie flush with the top surface of the film and become firmly physically bonded to the film due to the slight flowing of the portions of the thermoplastic film around the peripheries of the embedded portions of such ink masses. Following the pressure operation, the pressure plate is elevated off of the cellophane sheet and the resultant imprinted film, together with the adhering cellophane sheet, are passed through the guide rolls 7, 7', whereupon the cellophane sheet, which is but lightly adhering to the film, is stripped therefrom and from the embedded or inlaid pattern therein, all in the manner indicated in Fig. 2, and the finished imprinted film illustrated in Fig. 3 is obtained.

Referring to Fig. 6 the reference numerals 11, 11' designate thermoplastic films to be printed and between which is interposed a cellophane sheet 12, having ink impressions a', representing stripes, printed on both sides thereof. As shown in Fig. 7, the opposing films with the ink impressions embedded therein can be cleanly and readily stripped from the cellophane sheet following the opening of the press in the same general manner as that illustrated in Fig. 2.

In Fig. 8 the reference numeral 15 designates a supported film having a re-inforcing backing of paper or cloth 16, which film is adapted to be substituted for the above described unsupported films.

In Fig. 9 the reference numeral 20 designates a pre-corrugated or pre-embossed cellophane sheet which may be substituted for the printed, flat cellophane sheet shown in Fig. 1, the reference letter g designating the embossing or corrugations and a the ink impressions in the form of stripes originally carried by the sheet 20 and which have become embedded in the thermoplastic film 21 following the completion of the pressure stroke of the press.

In Figs. 10 and 11 the reference numeral 25 designates the pressure plate of a press whose bottom surface has been engraved to form a selected pattern, for example, grooves h and circular recesses or cups j. The reference letter 26 designates the thermoplastic film having applied thereto the ink impressions constituting ribs h', of triangular cross section, and dots j' in relief thereon, as a result of the transfer of such impressions from the cellophane sheet 27 to the underlying film during the pressure stroke of the press.

Desirably the ink employed to print the cellophane sheet 3 is a so-called vinyl ink of the type now used in the direct printing as above explained of heat-sealable thermoplastic film, such for example as an ink composed of say 20% of low molecular weight vinyl chloride-vinyl acetate copolymer resin, 15% of the selected pigments, 50% of suitable solvents, as ketones or esters, and 15% of a hydrocarbon diluent, such as toluene, propylene or the like. Inks of this general type which are highly satisfactory for use in my novel method of printing are now also commercially available.

By reference to Figs. 2, 3, and 3a it will be observed that the boundaries of either the stripes a or of the circular dots d, d' in the alternative design are clean cut or of excellent definition, this being due to the fact that the pressure was applied by the pressure plate over the entire upper face of the cellophane sheet rather than directly to the ink masses themselves, as is now customary, as above explained in the case of direct printing upon thermoplastic film. Instead of any truncated convex stripes, such as the stripes C (see Fig. 4), being inlaid in such film with the air gaps b therebetween, filled in with ink or film material or both, which would inevitably result in the boundaries of the stripes e being irregular and of poor definition, the top surface of the stripes c (see Fig. 3) will exactly correspond, as to the boundaries thereof, to the faces of such stripes which were adhesively united to the original cellophane sheet and the original air gaps b (see Fig. 1), will be filled in by the resinous material of the film 2 which flows thereunto during the pressure stage of the process and serves to firmly bond the inlaid ink masses to the film proper.

The following are some of the outstanding advantages of my novel method of printing on thermoplastic film:

(1) The process lends itself to the printing of either supported or unsupported heat-sealable, thermoplastic film.

(2) Substantially perfect definition of the pattern or characters transferred from the master cellophane sheet.

(3) Due to the fact that the superimposed sheets are dry, i. e., there being no solvents present, and due to the fact that the cellophane is substantially non-stretchable and the pressure is applied to the entire top surface thereof, substantially perfect registry is obtained when multicolor designs or patterns are to be printed on the film.

(4) Since the master cellophane sheet can be printed on both sides either with the same or different ink impressions not only can double production be obtained with the same number of operations but the saving in time and heat, is very substantial, being almost 50%. Also the number of chrome-plated hot plates required when the pressure is applied to a stack of superimposed sheets of cellophane and of film, is cut in half.

(5) The wastage where faulty printing of the master cellophane sheet occurs, as contrasted with that where the direct printing on the film is faulty, is a negligible item, due to the cheapness of the cellophane by comparison with the cost of a sheet of film of the same area.

(6) The use of expensive non-mark-off inks is unnecessary since the transfer is effected between two substantially dry sheets of material.

(7) Very delicate patterns can be transferred, due to the absence of volatile solvents in either of the superimposed sheets, the fact that the cellophane is substantially non-stretchable and the pressure is applied thereto over its entire upper surface rather than directly to dry ink impressions which, due to surface tension, had, when wet, assumed a convex or globular shape which caused distortion when pressed into the film, and also due to the fact that the ink impressions, especially if chilled, are relatively hard and can be readily pressed into softened, tacky film without distortion of such impressions.

(8) The cellophane being incompatible with the vinyl inks and with the heat-sealable thermoplastic film to the extent that it is not heat-sealable thereto, readily yield up the ink impressions to the film and also can be readily stripped off from the film without pulling out the ink inlays therein when the transfer has been completed.

(9) Printers of cellophane can supply the master plates, as no expensive drying and fusing equipment such as is required in direct printing on thermoplastic film is required.

(10) If desired, the cellophane can be both embossed and printed and both the embossing thereof and the ink impressions will be simultaneously transferred to the film, thereby eliminating the necessity for the subsequent embossing of the printed film on those cases where an embossed film is required.

(11) Due to the extreme thinness of cellophane as compared with the thermoplastic film to be printed and also its lesser density, the weight per yard thereof is but about one-thirty-fifth of that of such film and, consequently, the expense of shipping the printed cellophane plates to the manufacturer of the film is almost negligible as contrasted with the present expense involved in shipping film from the place of manufacture to the printer and back again.

(12) Small printers or embossers can readily change their patterns and, consequently, can accept orders for but a few yards of each different pattern which would be unprofitable were direct printing on thermoplastic films resorted to.

In lieu of cellophane, other materials that are not heat-sealable and therefore non-compatible to the extent hereinbefore specified with vinyl chloride resin or vinyl chloride-vinyl acetate resin copolymers and which are adapted for such inlay transfer printing may be substituted therefor and more especially paper coated with urea-formaldehyde resins, glassine, cellulose acetate films, but cellophane and cellulose acetate films are much to be preferred because of the extreme toughness of very thin sheets thereof, the extreme smoothness and cheapness thereof and their non-compatibility to thermoplastic film when employed in the aforesaid method of inlay-transfer printing.

While it is usually preferable to chill the ink applied to the cellophane sheet before effecting the transfer to the film, excellent results can often be obtained by effecting the transfer at room temperature of inked impressions previously dried before the commencement of the transfer stage of the process.

Since cellophane, because of its cheapness, can be discarded without serious loss after each operation of the press, the employment of an expensive non-mark-off ink is not only unnecessary but the tedious and difficult cleaning of any mark-offs on the chrome plated steel pressure plates which would tend to be transferred to the film is also avoided.

If desired, in lieu of embossing the printed cellophane sheet prior to positioning the same in the press, an embossed metal plate may be assembled with the printed cellophane sheet and the film and due to the extreme thinness of the cellophane, the embossed pattern on such plate can be simultaneously transferred in the pressure stage of the operation with the imprinted pattern of the cellophane sheet to the thermoplastic film.

The inked impressions on the cellophane sheet, as previously stated, are dried prior to positioning the assembled printed cellophane sheet and the pre-formed heat-sealable thermoplastic film on the platen of the press in order to drive off all volatile solvents from such impressions and to set the same.

Other pre-formed heat-sealable thermoplastic films than the aforesaid vinyl chloride resin (Koroseal) and vinyl chloride-vinyl acetate copolymers (Vinylite) can be successfully printed with so-called vinyl inks in accordance with the method hereinbefore described, more especially vinyl chloride-vinylidene chloride copolymers (Saran).

Either cellophane, a regenerated cellulose plastic or Lumarith, a cellulose acetate product neither of which is heat-sealable, are especially suitable for use in the printing effecting the inlay transfer of inked impressions to the heat-sealable thermoplastic film because of their aforesaid non-compatibility, their exceeding smoothness, light weight, transparency and cheapness.

Various modifications of above method of printing thermoplastic film, which are within the scope of the appended claims, may be made without departing from the spirit of my invention.

Having thus described my invention, what I claim and desire to secure by Letters Patent is:

1. The method of inlay-transfer printing on a pre-formed heat-sealable thermoplastic film, which comprises printing ink impressions of the image to be transferred on a sheet of non-absorbent, smooth, substantially non-stretchable material that is non-compatible with the heat-sealable thermoplastic film to be printed to the extent that it is not heat-sealable thereto, then substantially drying the printed image, then superimposing said dry printed sheet and a dry pre-formed thermoplastic film to be printed, one on the other, with the printed surface of the sheet in direct contact with the surface of the thermoplastic film, subjecting the superimposed sheets to sufficient heat to slightly soften the film without completely melting the same and also to sufficient pressure to transfer the image from said sheet to the film and to inlay the same therein and then stripping off the sheet from the film and the image so inlaid therein and recovering the resultant printed film.

2. The method of inlay-transfer printing on preformed heat-sealable thermoplastic films, which comprises printing on opposite sides of a sheet of non-absorbent, substantially non-stretchable material that is non-compatible with the thermoplastic film to be printed to the extent that it is not heat-sealable thereto, drying the printed image, then while the said dry printed sheet is interposed between two sheets of preformed, dry heat-sealable thermoplastic film, that are heated to a sufficient temperature to soften the same, subjecting the superimposed layers of film and the printed sheet to sufficient pressure to transfer the printed images from said interposed sheet, each to a separate layer of film in contact with said sheet, and then stripping the layers of film from the sheet and recovering the resultant printed films.

3. The method of inlay-transfer multi-color printing on heat-sealable thermoplastic film, which comprises applying ink impressions in a plurality of colors by successive printing operations on a sheet of non-absorbent substantially non-stretchable material that is non-compatible with the selected heat-sealable thermoplastic film to be printed to the extent that it is not heat-sealable thereto, substantially drying the ink impressions to drive off the volatile solvents present therein, then superimposing said dry printed sheet and a dry pre-formed thermoplastic film to be printed, one on the other, with the printed surface of the sheet in direct contact with the surface of the thermoplastic film, subjecting the superimposed sheets to sufficient heat to slightly soften the film without completely melting the same and also to sufficient pressure to transfer the image from said sheet to the film and to inlay the same therein and then stripping off the sheet from the film and the image so inlaid therein and recovering the resultant printed film.

4. In the method of inlay-tranfer printing as claimed in claim 1, wherein the ink impressions are printed with vinyl ink and the thermoplastic film is of the vinyl resin type.

5. In the method of inlay-transfer printing as claimed in claim 1, wherein the original printed sheet from which the image is to be transferred is first embossed prior to the commencement of the transfer stage of the process and as a consequence such embossing is reproduced on the thermoplastic film simultaneously with the transfer of the printed image thereto.

6. In the method of inlay-transfer printing as claimed in claim 1, wherein the dry ink impressions are first chilled to harden the same and the heat-sealable thermoplastic film is heated to soften the same prior to the actual transfer of such impressions to the thermoplastic film.

7. In the method of inlay-transfer printing as claimed in claim 1, wherein the printed sheet from which ink impressions are to be transferred to heat-sealable thermoplastic film, consists of cellophane.

8. In the method of inlay-transfer printing preformed heat-sealable thermoplastic film, the steps which comprise effecting the transfer of previously dried ink impressions on a sheet of substantially non-stretchable, substantially non-absorbent material to pre-formed heat-sealable thermoplastic film which is also substantially dry and which is non-compatible with such sheet of material to the extent that it is not heat-sealable thereto, such transfer being effected by subjecting the dried sheet, while superimposed so that the printed impressions are next to the thermoplastic film, to heat and pressure sufficient to inlay the ink impressions in the film and then when such transfer is completed stripping the film and the impressions inlaid therein from such sheet.

9. In the method of inlay-transfer printing as claimed in claim 1, wherein the thermoplastic film to which the ink impressions are transferred is a supported film having a reinforcing backing of a different material.

10. In the method of inlay-transfer printing, as claimed in claim 1, wherein the ink impressions printed on the non-absorbent sheet consist of heat-sealable thermoplastic material.

OSWALD K. MARQUARDT.

REFERENCES CITED

The following references are of record in the file of this patent:

UNITED STATES PATENTS

| Number | Name | Date |
| --- | --- | --- |
| 1,744,829 | Dreyfus | Jan. 28, 1930 |
| 2,235,782 | Wiley | Mar. 18, 1941 |
| 2,404,073 | Karfiol et al. | July 16, 1946 |
| 2,407,549 | Gurwick | Sept. 10, 1949 |
| 2,470,493 | Karfiol et al. | May 17, 1949 |
| 2,477,300 | Karfiol et al. | July 26, 1949 |